May 13, 1924.                M. RASMUSSEN                1,493,702
                            INNER TUBE FOR TIRES
                            Filed April 21, 1922
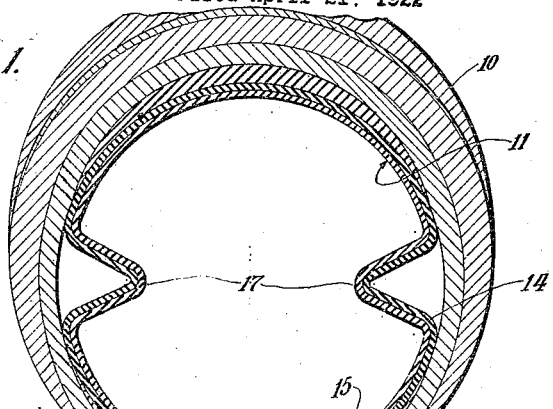
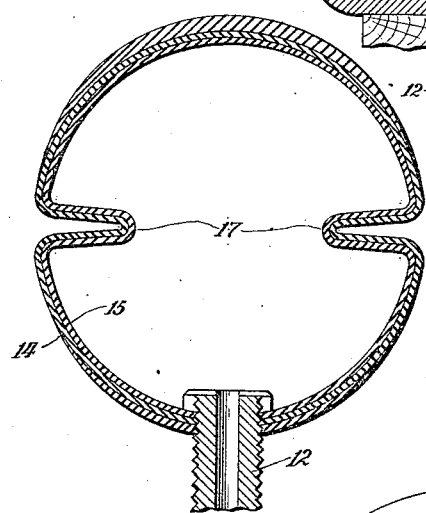
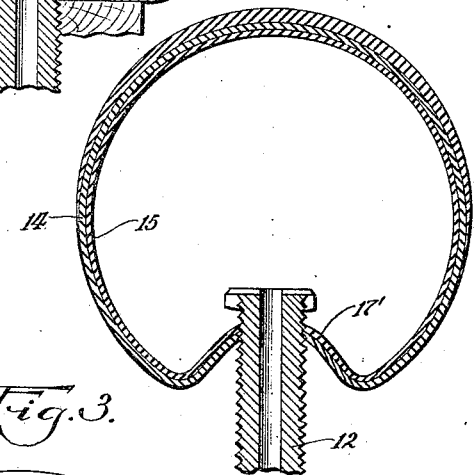
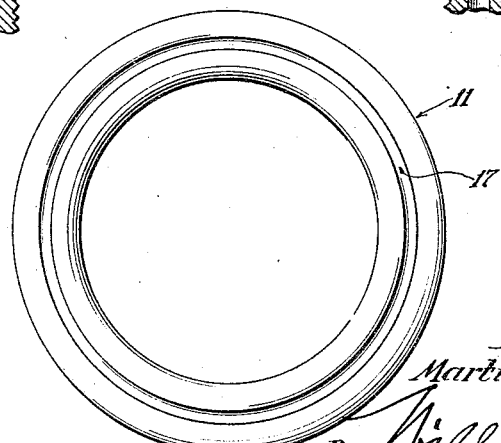
Inventor:
Martin Rasmussen.
By William H. Hale Patented May 13, 1924.

1,493,702

UNITED STATES PATENT OFFICE.

MARTIN RASMUSSEN, OF RACINE, WISCONSIN.

INNER TUBE FOR TIRES.

Application filed April 21, 1922. Serial No. 555,900.

*To all whom it may concern:*

Be it known that I, MARTIN RASMUSSEN, a citizen of the United States, and a resident of Racine, in the county of Racine and State of Wisconsin, have invented certain new and useful Improvements in Inner Tubes for Tires; and I do hereby declare that the following is a full, clear, and exact description thereof, reference being had to the accompanying drawings, and to the characters of reference marked thereon, which form a part of this specification.

This invention relates to improvements in inner tubes for pneumatic tires, and refers more specifically to a form of inner tube that is so constructed as to increase its durability, and to avoid blow outs, and pinching of inner tube in a manner to rupture the same.

An inner tube embodying my invention embraces an inelastic or non-stretchable tube which is provided in its wall with one or more depressions of flute like formation formed by forcing inwardly the material of the tube to produce a rib or ribs internally of the tube and a depression or depressions externally of the tube. Thereafter when air under pressure is forced into the tube the material of the tube wall is displaced, by reason of said flute-like formations so as to expand the tube against the wall of the casing to produce the desired pneumatic effect, without, however, stretching the tube.

The wall of the inner tube is made of a material possessing considerable tensile strength to withstand high internal pressure without rupturing the tube wall, and the wall is of such thickness as to avoid pinching or chafing of the tube wall, and such, also as to avoid protrusion of the tube wall through puncture openings in the casing wall. Preferably the structure of the tube is such that in the parts thereof which are subject to the greatest flexure in the use of the tire, or at the sides of the tube, are well disposed to withstand such flexure without destructive effect on the inner tube.

In the drawings, showing two embodiments of my invention:

Figure 1 is a cross section of a tire equipped with a tube made in accordance with my invention, showing the tube inflated.

Figure 2 is a cross section of the deflated inner tube.

Figure 3 is a side elevation of the inner tube.

Figure 4 is a modified form of the inner tube.

As shown in said drawings, 10 designates the outer casing or shoe of the tire, and 11 designates the inner tube. Said inner tube is shown as being made of one or more layers of suitable material, such as rubberized canvas, there being at least one layer at the sides of the tube, and preferably there are added layers at the tread portion to resist puncture, and the inner portion of the tube may be thickened by the addition of a layer or layers through which the shank of the air valve 12 extends.

The inner tube is made of an outer layer or layers 14 of rubberized canvas or the like and an inner layer 15 of a non-heat conducting material, such as asbestos cloth. The tube is first made of cylindric cross-section, oversize with respect to the casing with which it is to be used. Thereafter the tube is placed over a suitable form, constituting part of a vulcanizing machine. Said form has annular grooves or depressions at its opposite sides, and the material of the oversize tube is forced into these depressions by wedge cross-section ring members constituting also parts of said vulcanizing machine. The parts thus assembled are held in position during the vulcanizing operation. After vulcanization the walls of the flute like depression are permanently fixed or set relatively to the other parts of the tube wall, as shown in Figure 2, the inner narrowest parts of the depressions constituting hinges to accommodate radial deformation of the tube in use.

The inner tube thus formed is placed in the outer casing in the usual manner of fitting an inner tube to the casing and after the parts have been assembled and air under pressure has been admitted to the inner tube through the valve 12, the wall of the said tube is displaced, owing to the presence of, and including the, flute-like depression 17, so as to cause the inner tube to bear against and support all parts of the outer casing, except those portions of the latter that lie directly opposite the outwardly opening depressions on the outer sides of said tube, due to said flute-like formations.

It will be readily seen from an inspection of Figure 1 that those portions of the tire which are repeatedly flexed in action is opposite to the flute-like formations, so that said flexion of the tire as a whole, including the outer casing and the tube does not impose severe flexing stresses on the inner tube in a manner tending to rupture the same. It will also be observed in the structure shown in Figure 1, even should the outer casing become broken or punctured, the thickness of the inner tube is such as to avoid its bulging through the broken casing, and also that the strength of the inner tube is such as to hold its pressure. Therefore, with the use of my improved inner tube the tire may be continued in use with a considerable or substantial breaking of the wall of the casing and until the casing is worn so as to be practically unfit for further use.

In Figure 4 is shown a construction wherein a single flute-like depression 17' is employed at the radially inner side of the tube, and this flute-like depression may be made of sufficient size to receive the shank of the air valve. In this event the expanded inner tube will lie continuously against the inner wall of the casing except at the radially inner portion thereof.

In both forms of construction the wall of the inner tube at the outer side thereof is preferably formed with a greater number of layers than at its sides, and in the construction shown in Figure 1, said walls of the inner tube may be made with an additional layer or layers at its radially inner side to strengthen the tube at this place. When adapting the tube to a standard casing the casing may be worn down to a greater extent than with the use of an ordinary rubber inner tube. For the same reason an outer casing of substantially less dimension and weight can be used, while producing a tire structure of great durability, as compared to present standard tire constructions. It will be understood that the said inner tube may be made of other material than those suggested, provided the resistance against blow and rupture and pinching of the present tube is not impaired. It will also be understood that the terms "flute-like depressions" is not intended to be limiting as to a particular manner of rendering the inclosed tube expansible, but other configurations of the tube wall may be employed.

I claim as my invention:

1. An inner tube for a pneumatic tire made of non-stretchable material and provided with one or more circumferential flute-like formations produced by forcing the wall of the tube inwardly and adapted to lie out of contact with a tire casing when the tube is operably inflated.

2. An inner tube and casing for a pneumatic tire, said tube being enclosed within the casing and made of non-stretchable material and provided at its laterally opposite sides, when the tube is operably inflated, with inwardly extending, V-shaped, flute-like formations, the inner parts of which constitute hinges about which the tube flexes under radial deformation.

In witness whereof I claim the foregoing as my invention, I hereunto append my signature this 19th day of April, 1922.

MARTIN RASMUSSEN.